(12) United States Patent
Fukumori

(10) Patent No.: US 9,030,698 B2
(45) Date of Patent: May 12, 2015

(54) IMAGE PROCESSING APPARATUS CAPABLE OF DISPLAYING DOCUMENT THUMBNAIL IMAGE, IMAGE PROCESSING APPARATUS CONTROL METHOD, AND STORAGE MEDIUM

(71) Applicant: Canon Kabushiki Kaisha, Tokyo (JP)

(72) Inventor: Takayuki Fukumori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/939,097

(22) Filed: Jul. 10, 2013

(65) Prior Publication Data
US 2014/0016162 A1   Jan. 16, 2014

(30) Foreign Application Priority Data

Jul. 13, 2012 (JP) .................. 2012-157554

(51) Int. Cl.
*G06F 15/00* (2006.01)
*H04N 1/00* (2006.01)
*H04N 1/21* (2006.01)
*H04N 1/32* (2006.01)

(52) U.S. Cl.
CPC ......... *H04N 1/0097* (2013.01); *H04N 1/00408* (2013.01); *H04N 2201/3273* (2013.01); *H04N 1/2166* (2013.01); *H04N 1/32101* (2013.01); *H04N 2201/218* (2013.01); *H04N 2201/3274* (2013.01); *H04N 2201/3226* (2013.01)

(58) Field of Classification Search
CPC .................. H04N 1/0097; H04N 1/00408
USPC ........................................... 358/1.15
See application file for complete search history.

(56) References Cited

U.S. PATENT DOCUMENTS

2008/0016090 A1* 1/2008 Fukata ........................ 707/100
2008/0123123 A1* 5/2008 Kawaharada ................ 358/1.12

FOREIGN PATENT DOCUMENTS

JP         2009-223521 A     10/2009

* cited by examiner

*Primary Examiner* — Saeid Ebrahimi Dehkordy
(74) *Attorney, Agent, or Firm* — Canon USA, Inc., I.P. Division

(57) ABSTRACT

An image processing apparatus includes a memory, and a processor in communication with the memory, the processor configured to control a storage unit configured to associate and store a document and a thumbnail image of a top page of the document, a deletion unit configured to delete a page designated from among pages of the document stored in the storage unit, and a generation unit configured to, in a case where a page to be deleted by the deletion unit is a top page of the document, generate a thumbnail image based on the top page of the document after deletion.

21 Claims, 16 Drawing Sheets

FIG. 7

| DOCUMENT LIST | | |
|---|---|---|
| DOCUMENT ID | THUMBNAIL IMAGE ID | THUMBNAIL IMAGE NON-GENERATION FLAG |
| 1 | 2 | OFF |
| 2 | NONE | ON |
| 3 | 1 | OFF |
| 4 | 3 | OFF |
| 5 | NONE | ON |
| 6 | 3 | OFF |
| 7 | 3 | OFF |
| 8 | 1 | OFF |

FIG. 8

| THUMBNAIL IMAGE REFERENCE COUNTER MANAGEMENT TABLE | |
|---|---|
| THUMBNAIL IMAGE ID | REFERENCE COUNTER |
| 1 | 2 |
| 2 | 1 |
| 3 | 3 |

IMAGE PROCESSING APPARATUS CAPABLE OF DISPLAYING DOCUMENT THUMBNAIL IMAGE, IMAGE PROCESSING APPARATUS CONTROL METHOD, AND STORAGE MEDIUM

BACKGROUND

1. Field of the Disclosure

Aspects of the present invention generally relate to an image processing apparatus that includes a storage device for storing data input from a scanner and data received from a computer as a document. More specifically, the present invention relates to an image processing apparatus that includes a function of displaying a thumbnail image of the document.

2. Description of the Related Art

Conventionally, an image processing apparatus has been known that can store data input by reading an original with a scanner and data received from a host computer via a network as a document in a predetermined storage area of a hard disk, and repeatedly executing processing such as printing, editing, and transfer. Such a storage area of a hard disk for storing documents is generally referred to as a "box". Further, an image processing apparatus has also been known that includes a document editing function of deleting an arbitrary page from the pages of a document in a box and inserting another document between pages.

In addition, there are also image processing apparatuses that include a thumbnail display function of reducing the size of documents stored in the box and displaying the reduced documents as thumbnail images in a list on an operation panel. Since the display of thumbnail images is used to allow a user to easily confirm which document the document is, it is common to use a reduced image of the top page, which is a representative page of the document, as the thumbnail image.

Japanese Patent Application Laid-Open No. 2009-223521 discusses such an image processing apparatus.

SUMMARY

According to an aspect of the present invention, an image processing apparatus includes a memory, and a processor in communication with the memory, the processor configured to control a storage unit configured to associate and store a document and a thumbnail image of a top page of the document, a deletion unit configured to delete a page designated from among pages of the document stored in the storage unit, and a generation unit configured to, in a case where a page to be deleted by the deletion unit is a top page of the document, generate a thumbnail image based on the top page of the document after deletion.

Further features of the present invention will become apparent from the following description of exemplary embodiments with reference to the attached drawings.

BRIEF DESCRIPTION OF THE DRAWINGS

FIG. 7 is a list of documents stored in a box.

FIG. 8 is a table for managing a reference counter of a thumbnail image.

DESCRIPTION OF THE EMBODIMENTS

Various exemplary embodiments, features, and aspects of the invention will be described in detail below with reference to the drawings.

According to an exemplary embodiment, an image processing apparatus will be described that includes a thumbnail display function.

First, before describing the image processing apparatus that includes a thumbnail display function according to the present exemplary embodiment, issues with a conventional image processing apparatus that includes a thumbnail display function will be described.

A conventional image processing apparatus that includes a thumbnail display function suffers from an issue that, if a thumbnail image is generated after a user instructs to display a thumbnail image, the image processing apparatus makes the user wait during the operation because it takes a considerable time to generate and display the thumbnail image.

One way to resolve this issue is to generate a thumbnail image in advance before the instruction to display the thumbnail image is issued by the user, and associate the generated thumbnail image with the document in a box. However, this method may cause the following another issue.

As described above, a document in a box may have an arbitrary page deleted or be merged with a plurality of other documents. In other words, contents of the document can dynamically change. In addition, a thumbnail image is generated from the top page of the document. Therefore, a document thumbnail image that is generated in advance may not appropriately express the content of the document.

The above-described issue will be described based on a specific example. For example, in an image processing apparatus capable of deleting an arbitrary page of a document in a box, the top page of the document can also be deleted. If the top page is deleted, a document thumbnail image that was generated before the top page was deleted will not appropriately express the content of the document from which the top has been deleted, so that a user will be confused.

Accordingly, by focusing on these issues with such a conventional image processing apparatus that includes a thumbnail display function, the present exemplary embodiment is directed to a method that suitably associates a document stored in a box (storage unit) with a thumbnail image.

According to the present exemplary embodiment, a digital multifunction peripheral that includes a plurality of functions, such as a copy function, a print function, and a facsimile function, will be described as an example of an image processing apparatus.

Figure 1:
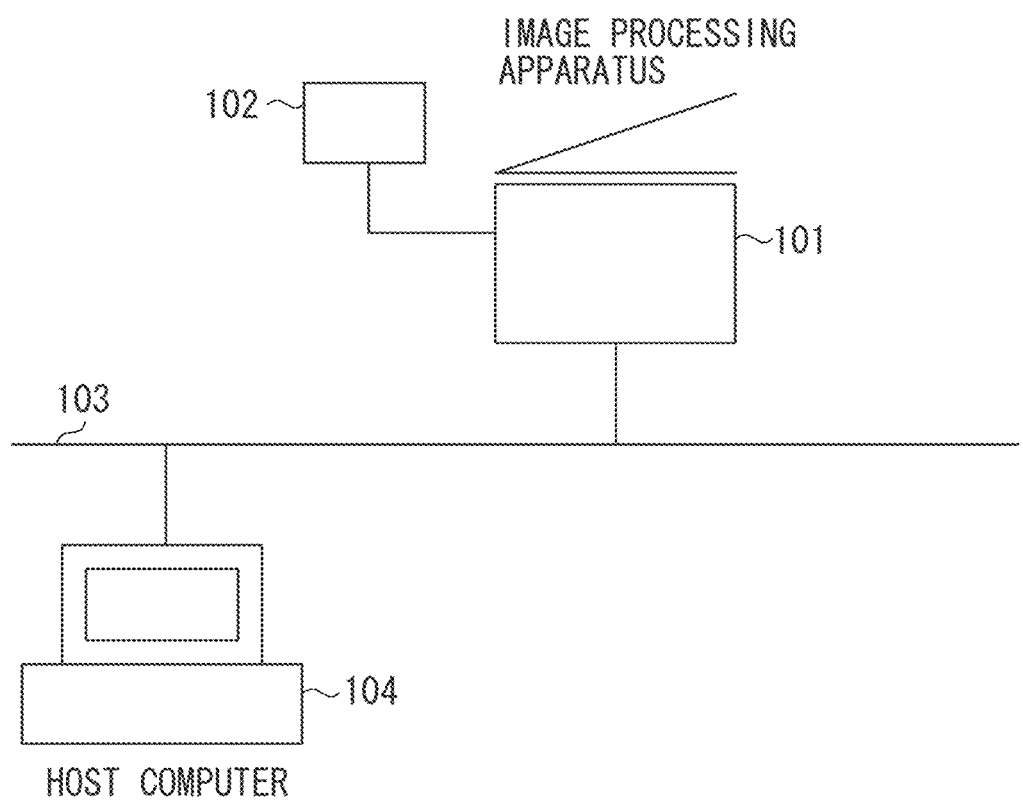
FIG. 1 is an overall view of a system configured from an image processing apparatus and a host computer.

FIG. 1 is an overall view of a system configured from an image processing apparatus 101 and a host computer 104. As illustrated in FIG. 1, the image processing apparatus 101 is communicably connected with the host computer 104 via a network 103. The image processing apparatus 101 can receive data in a page description language (PDL) format and execute processing such as printing, storage, and transfer of the received data. Further, the image processing apparatus 101 includes an operation unit 102 that includes a touch panel. Based on a user's instruction made on the operation unit 102, the image processing apparatus 101 can scan an original and execute processing such as printing, storage, and transfer of the data obtained by scanning.

According to the present exemplary embodiment, data received from the host computer 104 and data obtained by scanning an original with a scanner are referred to as a "document". A document may include image data.

Figure 2:
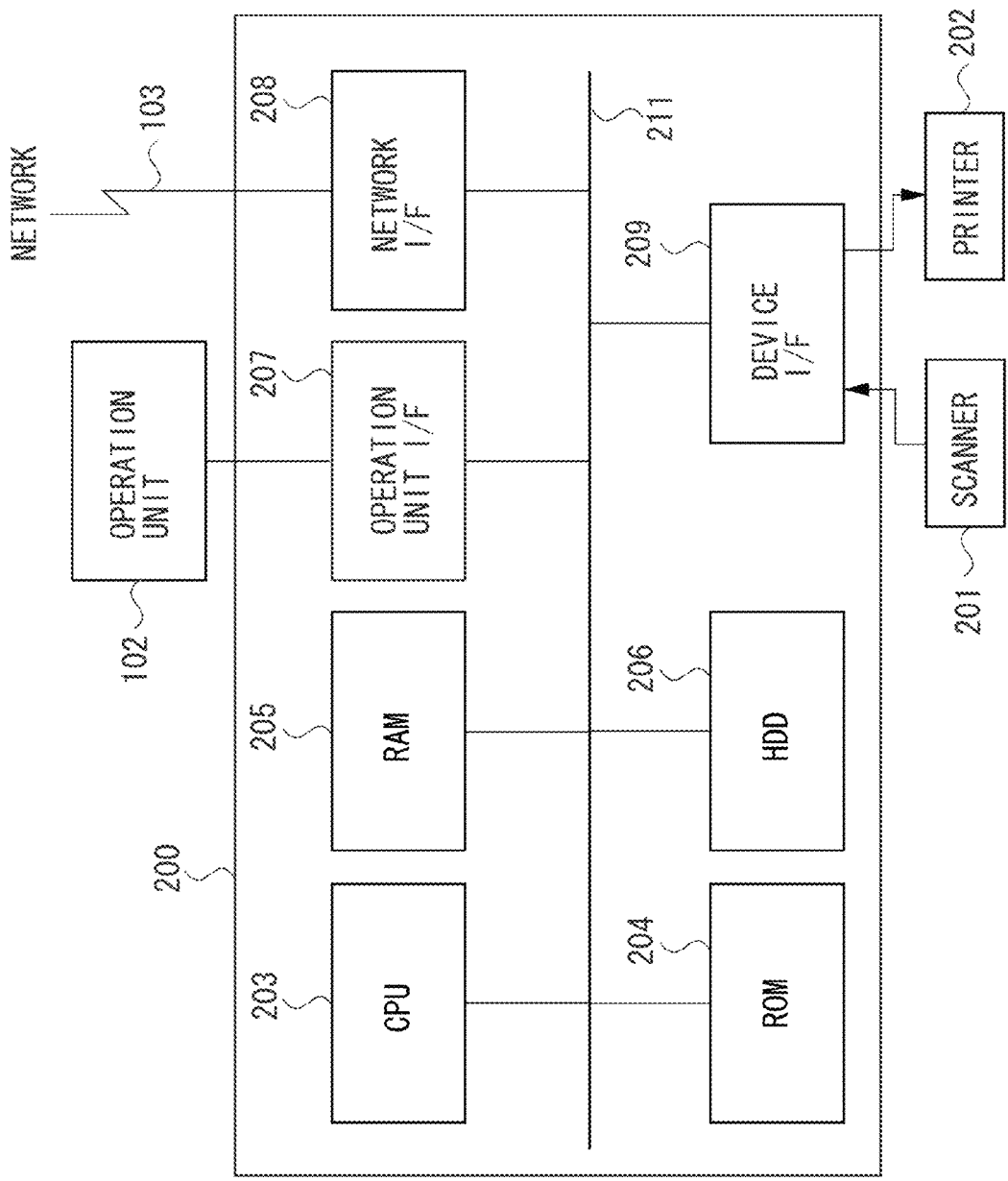
FIG. 2 is a hardware configuration diagram of an image processing apparatus.

FIG. 2 is a block diagram illustrating a hardware configuration of the image processing apparatus 101. The image processing apparatus 101 connects a scanner 201 which is an input device and a printer 202 which is an output device via a device interface (I/F) 209. Further, the image processing apparatus 101 includes a network interface 208, and performs input and output of image information and device information to/from an external device (such as the host computer 104).

A central processing unit (CPU) 203 is a processor that controls the image processing apparatus 101. A random-access memory (RAM) 205 acts as a system work memory in order for the CPU 203 to operate, and as an image memory for temporarily storing image data. A read-only memory (ROM) 204 is a boot ROM that stores a system boot program. A hard disk drive (HDD) 206 stores system software, applications, and image data.

The programs for executing the below-described flowcharts are also stored in the HDD 206. More specifically, each step in the below-described flowcharts is realized by the CPU 203 executing a program loaded from the HDD 206 into the RAM 205. However, a processor other than the CPU 203 may execute each step in the flowcharts, or the CPU 203 and another processor may cooperate and execute each step in the flowcharts.

Further, according to the present exemplary embodiment, a part of the storage area of the HDD 206 is used as a storage area (hereinbelow referred to as a "box") for storing documents. A document stored in the box is read as necessary by the CPU 203 and subjected to processing such as printing, editing, deleting, and sending. There may be a plurality of storage areas used as boxes. In addition, the plurality of storage areas may be classified on a user-by-user basis or a department-by-department basis.

An operation unit interface 207 is connected to the operation unit 102, and outputs data of an image to be displayed on the operation unit 102 to the operation unit 102. Further, the operation unit interface 207 also plays the role of transmitting information input by the user from the operation unit 102 to the CPU 203.

The above-described devices and modules are arranged on a system bus 212.

The above is a description about the hardware configuration of the image processing apparatus 101.

<Structure of a Document Stored in a Box>

Next, a structure of a document stored in the box of the hard disk of the image processing apparatus 101 will be described.

Figure 3:
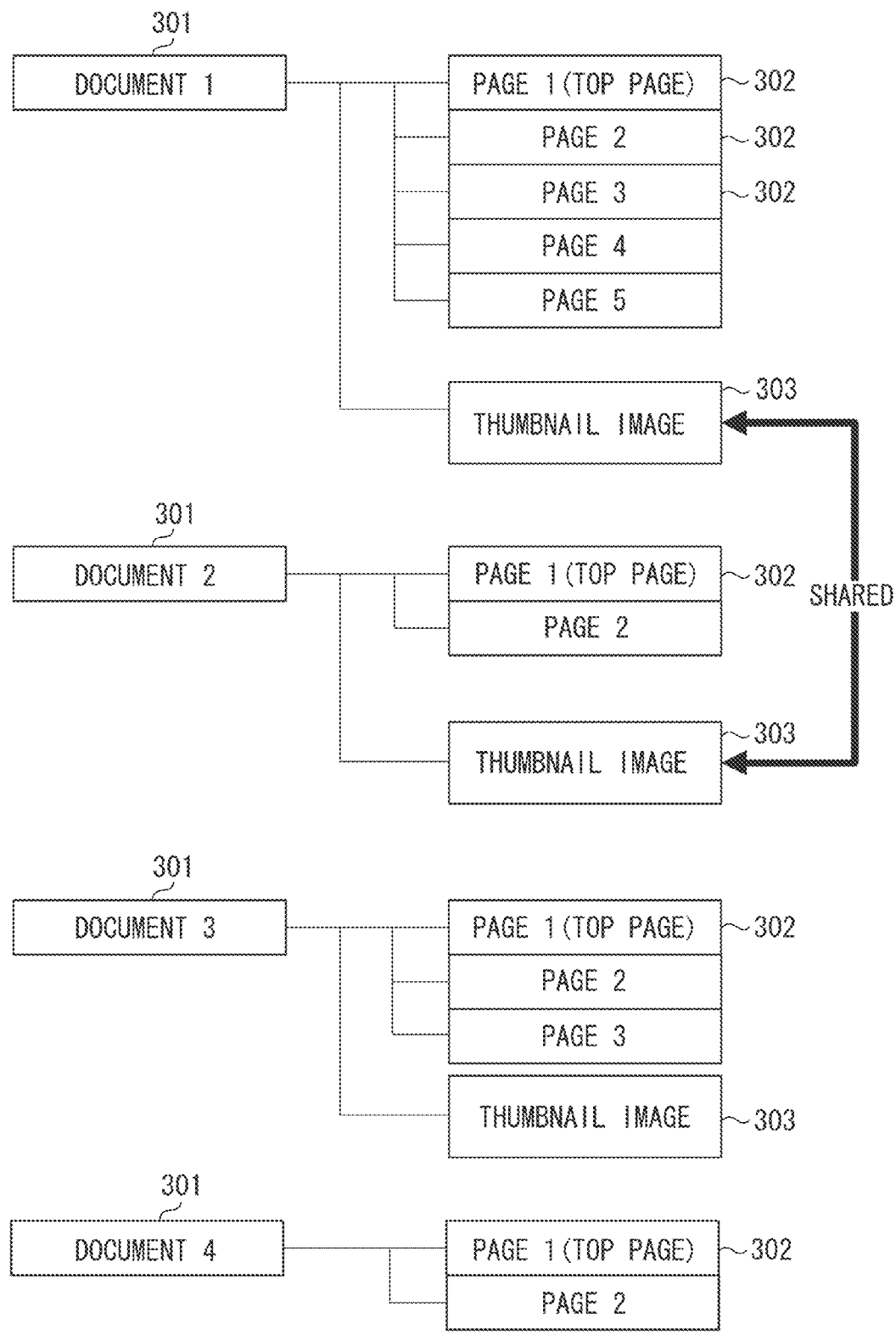
FIG. 3 illustrates a relationship among a document stored in a box of an image processing apparatus, pages forming the document, and a thumbnail image of the document.

FIG. 3 illustrates an example of the association among a document stored in the box, a group of pages forming the document, and a thumbnail image of the document. As illustrated in FIG. 3, a plurality of documents is stored in the box. Each document is associated with a plurality of pages that form the document and a thumbnail image of a top page of the document. FIG. 3 illustrates an example that four documents are stored in the box. A document 1 is formed from five pages, and a thumbnail image of a page 1 (the top page) is associated with the document 1. A document 2 is formed from two pages, and the same thumbnail image as the document 1 is associated with the document 2. This is because the document 1 and the document 2 have the same top page.

A document 3 is formed from three pages, and a thumbnail image generated from the top page of the document 3 is associated with the document 3.

A document 4 is formed from two pages. A thumbnail image is not associated with the document 4. This is either because the document 4 is a document that is newly stored in the box, or a top page of the document has been deleted.

As illustrated in FIG. 3, the group of documents stored in the box either have the same thumbnail image associated with them or do not have a thumbnail image associated with them.

Figure 4:
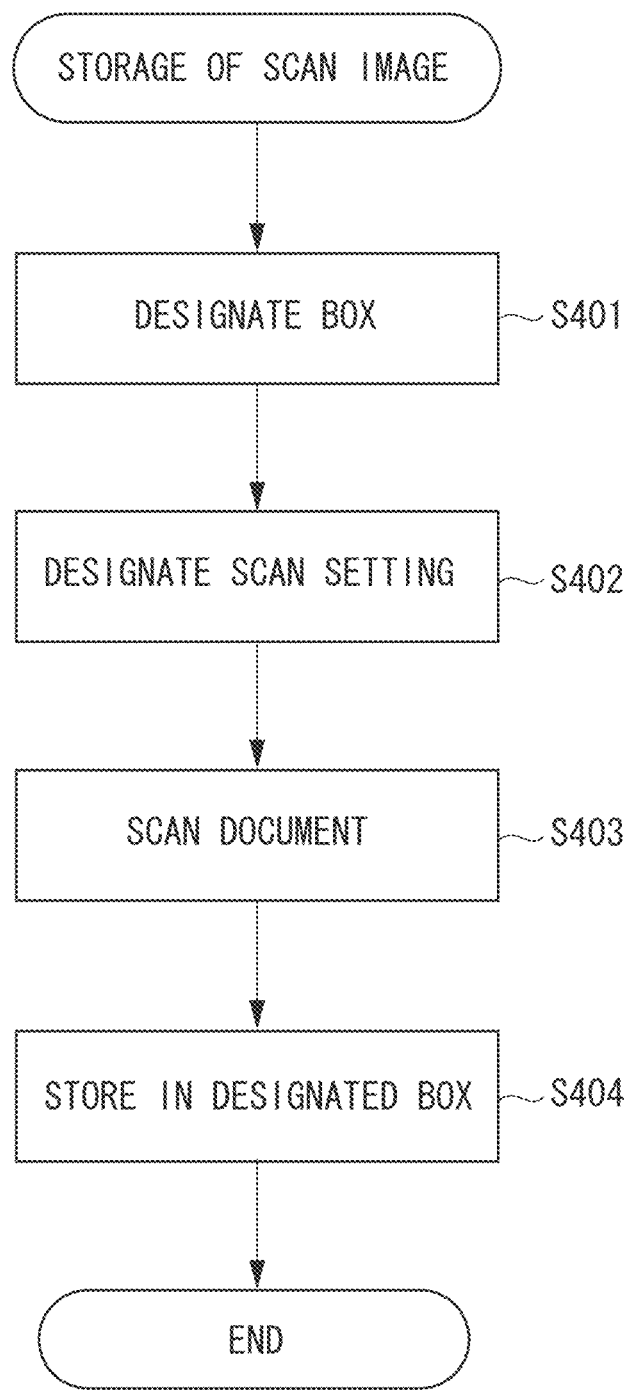
FIG. 4 is a flowchart illustrating processing for storing input image data obtained by scanning an original as a document in a box.

Next, the operation for storing a document in the box will be described with reference to FIGS. 4 and 5. The processing for storing a document in the box can be performed in the following two ways. One is to store image data generated by reading an original with the scanner 201 (hereinbelow, a "scan image"). The other is to store PDL data received from the host computer 104 via the network 103 (hereinbelow, a "PDL image"). These processes will be described with reference to FIGS. 4 and 5, respectively. In addition to these two ways, the present exemplary embodiment may store, for example, facsimile data received by a facsimile via a public line in the box. Further, the present exemplary embodiment may store a file received based on a file sharing protocol, such as sever message block (SMB) and Web-based distributed authoring and versioning (WebDAV), as a document in the box.

<Processing for Inputting a Document from a Scanner>

First, processing for storing image data input from the scanner 201 in the box as a document will be described with reference to FIG. 4. Each step illustrated in the flowchart in FIG. 4 is realized by the CPU 203 executing a program that is loaded from the HDD 206 into the RAM 205.

In step S401, the CPU 203 receives an instruction from a user made on the operation unit 102, and receives a box designation as a document storage destination. For example, if there is a plurality of boxes, a box number for identifying that plurality of boxes is designated.

Next, in step S402, the CPU 203 receives an instruction from the user made on the operation unit 102, and designates scan settings (e.g., reading resolution, an original size, color etc.). In step S403, the CPU 203 receives an instruction to start scanning from the user, and causes the scanner 201 to operate. The scanner 201 scans an original that is set in an automatic document feeder (ADF) or on a platen glass based on an instruction from the CPU 203, and inputs the scanned image data. Then, in step S404, the CPU 203 stores the image data input from the scanner 201 as a document in the designated box of the HDD 206.

The above is a description about an operation for storing image data obtained by scanning an original with the scanner 201 in the box of the HDD 206 as a document. However, according to the present exemplary embodiment, a thumbnail image of the document is not generated at the point when the document is stored in the box. As described below with reference to FIG. 6, the thumbnail image is generated in thumbnail image generation processing that is executed asynchronously with the box storage processing.

<Processing for Receiving a Document from the Host Computer 104>

Next, as another mode of storing a document in a box, a processing procedure for storing data received from the host computer 104 in the box will be described with reference to FIG. 5. Each step illustrated in the flowchart in FIG. 5 is realized by the CPU 203 executing a program that is loaded from the HDD 206 into the RAM 205.

Figure 5:
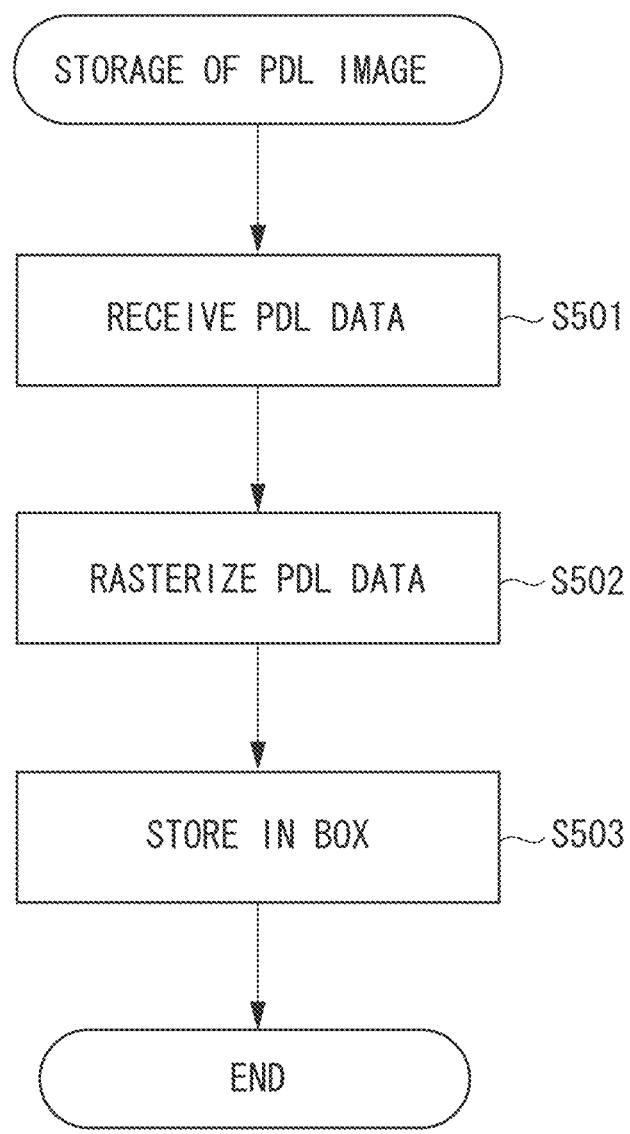
FIG. 5 is a flowchart illustrating processing for storing a page description language (PDL) image generated by a host computer as a document in a box.

Before starting the processing in the flowchart illustrated in FIG. 5, the following processing is performed by the host computer 104. More specifically, first, printer driver software (hereinbelow referred to as a "printer driver") installed on the host computer 104 performs a print setting, and designates the processing for storing in the box. When the user issues a start instruction on the host computer 104, the printer driver generates PDL data to be stored, and transmits the generated PDL data to the image processing apparatus 101. In this processing, the host computer 104 also transmits the print setting and the number of the designated storage destination box to the image processing apparatus 101 together with the PDL data.

When the PDL data is transmitted from the host computer 104, in step S502, the CPU 203 of the image processing apparatus 101 receives the PDL data via the network 103, and rasterizes the received PDL data into image data.

Then, in step S503, the CPU 203 stores the rasterized image data as a document in the box designated by the storage destination box number.

In FIG. 5, a thumbnail image of the document is not generated at the point when the document is stored in the box. As described below with reference to FIG. 6, the thumbnail image is generated by periodically executed thumbnail image generation processing.

<Processing for Generating a Document Thumbnail Image>

Next, an operation for generating a thumbnail image of a document stored in a box will be described with reference to FIG. 6.

Figure 6:
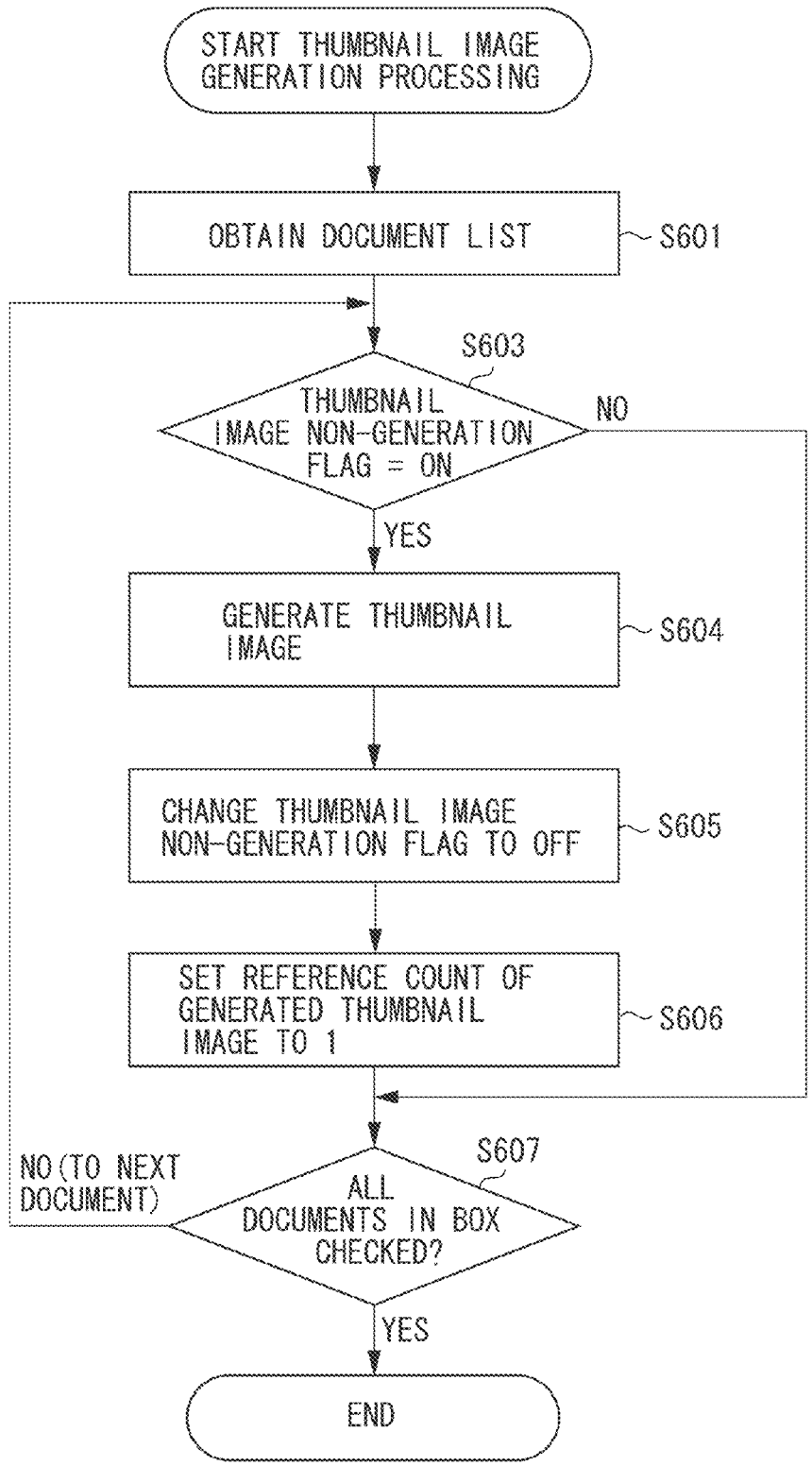
FIG. 6 is a flowchart illustrating processing for generating a thumbnail image.

FIG. 6 is a flowchart illustrating processing for generating a thumbnail image. The thumbnail image generation processing illustrated in FIG. 6 is executed asynchronously with the box storage processing in FIGS. 4 and 5. According to the present exemplary embodiment, the processing in FIG. 6 is periodically executed at a predetermined interval. If the predetermined interval is set at too long an interval, there is an increased risk that a thumbnail image will not have been generated when the user issues an instruction to display the thumbnail image of the document. Therefore, it is desirable to execute the thumbnail image generation processing at an interval that is as short as possible.

Each step illustrated in the flowchart in FIG. 6 is realized by the CPU 203 executing a program that is loaded from the HDD 206 into the RAM 205.

In step S601, the CPU 203 obtains from the HDD 206 a list of all documents stored in the box. A list may be like a document list 701 as illustrated in FIG. 7, for example.

As illustrated in the document list 701 in FIG. 7, each of the plurality of documents stored in the box is provided with a document identification (ID) for identifying the document. Whether a thumbnail image is associated with the document or not is managed for each document ID. If a thumbnail image is associated with the document, thumbnail image ID for identifying that thumbnail image is associated with the document ID. If a thumbnail image is not associated with the document, a "none" value is set, and a thumbnail image non-generation flag is set to ON.

In step S603, the CPU 203 focuses on one document included in the document list 701 obtained in step S601, and confirms the thumbnail image non-generation flag associated with the document ID that is being focused on. Then, the CPU 203 determines whether a thumbnail image for the document has been generated. For example, for a document newly stored in the box by the processing in FIGS. 4 and 5, since a thumbnail image would not have been generated yet, the CPU 203 may determine "YES" in step S603. Further, as described below, in some cases the CPU 203 may determine "YES" in step S603 in a case where the top page of the document has been deleted by page deletion processing or a plurality of documents have been merged, for example.

If it is determined that a thumbnail image has not been associated with the document (YES in step S603), the processing proceeds to step S604. In step S604, the CPU 203 reads the document having the document ID that is being focused on from the HDD 206, and generates a thumbnail image based on the top page of the read document. In step S605, the CPU 203 changes the thumbnail image non-generation flag of the document ID in the document list 701 illustrated in FIG. 7 from ON to OFF, associates the thumbnail image ID of the generated thumbnail image with the document ID, and registers the thumbnail image ID in the document list 701.

Next, in step S606, the CPU 203 newly registers the thumbnail image ID of the thumbnail image generated in step S605 in a management table 801 like that illustrated in FIG. 8 which is used for managing a reference counter of the thumbnail image.

FIG. 8 illustrates a management table for managing a reference counter of a thumbnail image. In the management table 801 illustrated in FIG. 8 are registered a thumbnail image ID for identifying a thumbnail image and a value that represents the number of documents referring to the thumbnail image. In the example illustrated in FIG. 8, the management table 801 indicates that the thumbnail image with the thumbnail image ID=1 is associated with two documents, and the thumbnail image with the thumbnail image ID=2 is associated with one document. Further, the thumbnail image with the thumbnail image ID=3 is associated with three documents.

In step S606, if the thumbnail image ID is newly registered in the management table 801, the CPU 203 sets the reference counter to "1".

Next, in step S607, the CPU 203 determines whether the processing from steps S603 to S606 has been executed for all of the documents included in the document list 701. If it is determined that the processing has been executed for all of the documents (YES in step S607), the processing performed in the flowchart in FIG. 6 is finished. On the other hand, if it is determined that the processing has not been executed for all of the documents (NO in step S607), the CPU 203 focuses on the next document in the document list 701, and performs the processing from step S603 and the subsequent steps.

The above is a description of an operation for generating a thumbnail image of a document in a box.

<Processing for Deleting a Document in a Box>

Next, the processing for deleting a document in a box will be described.

Figure 9:
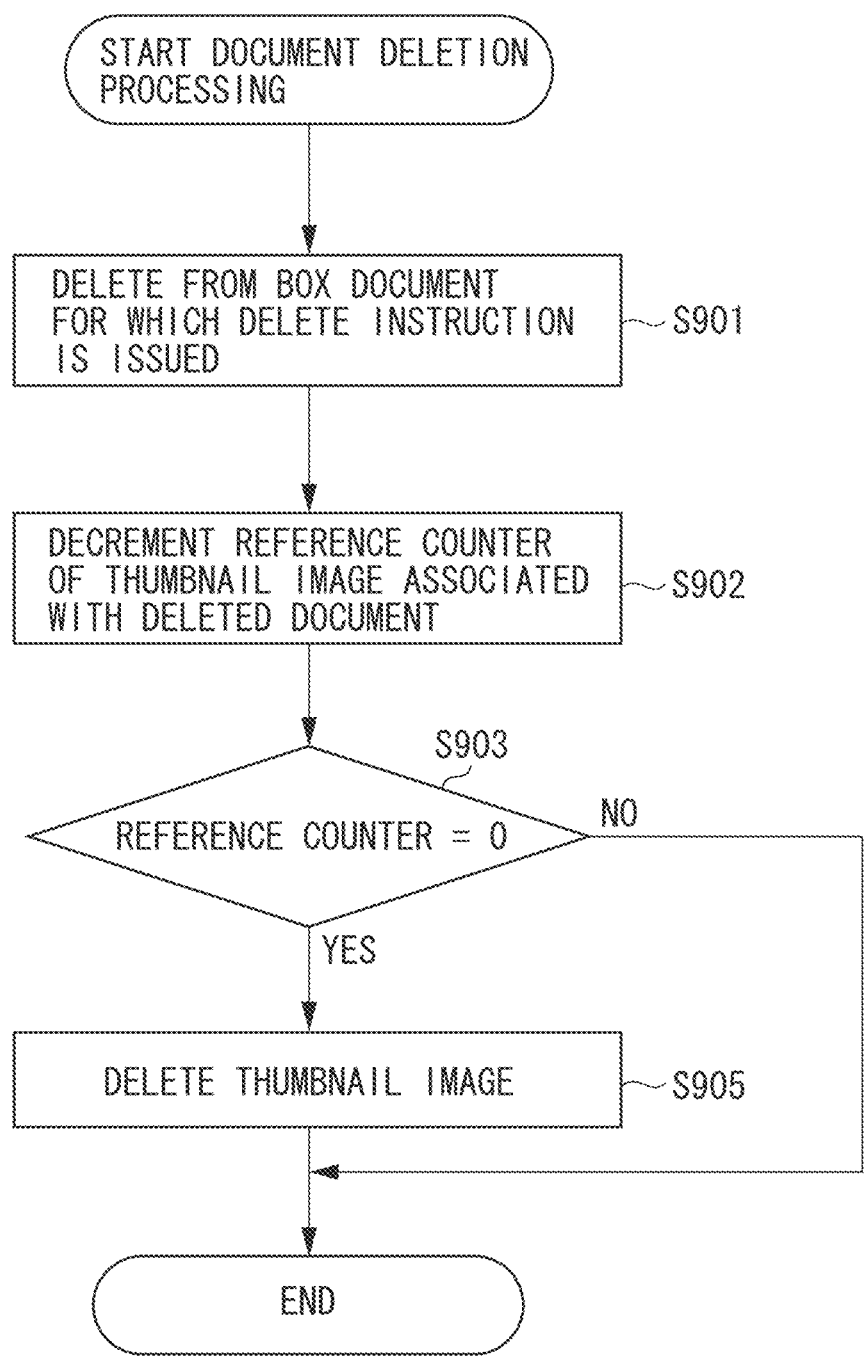
FIG. 9 is a flowchart illustrating processing for deleting a document stored in a box.

FIG. 9 is a flowchart illustrating processing for deleting a document stored in a box. The processing performed in the flowchart in FIG. 9 is started based on a user's instruction made on the operation unit 102. Each step illustrated in the flowchart in FIG. 9 is realized by the CPU 203 executing a program that is loaded from the HDD 206 into the RAM 205.

First, in step S901, the CPU 203 receives from the user a deletion instruction from the operation unit 102 to delete a document, and deletes the designated document from the box. The deletion instruction includes the document ID. The CPU 203 deletes the document identified by the document ID from the box. Further, instead of the document ID, the deletion instruction may include information capable of identifying the document, such as a document name or a file name.

In step S902, the CPU 203 reads the document list 701 and the management table 801. First, the CPU 203 specifies the thumbnail image ID associated with the document ID of the deleted document, and then decrements the reference counter of the relevant thumbnail image ID in the management table 801.

In step S903, the CPU 203 confirms the reference counter decremented in step S902. If it is determined that the reference counter is zero (YES in step S703), the CPU 203 deletes the thumbnail image. On the other hand, if it is determined that the reference counter is one or more (NO in step S703), the CPU 203 determines that that the thumbnail image is associated with another document, and the processing in FIG. 9 is finished without deleting the thumbnail image.

The above is a description of an operation for deleting a document stored in a box with reference to FIG. 9. According to the present exemplary embodiment, when a document for which a deletion instruction has been issued is deleted, a confirmation is made based on the reference counter regarding whether the thumbnail image associated with the document is also associated with another document. The processing is configured so that if it is determined that the thumbnail image is associated with another document, the thumbnail image is not deleted even if the document for which a deletion instruction has been issued is deleted. Accordingly, a situation in which a thumbnail image associated with another image is deleted can be prevented.

<Processing for Deleting an Arbitrary Page of a Document in a Box>

In FIG. 9, an example is illustrated in which a document per se stored in a box is deleted. In contrast, in FIG. 10, rather than deleting the document stored in a box per se, an example is illustrated in which just a specific page of a designated document is deleted.

Figure 10:
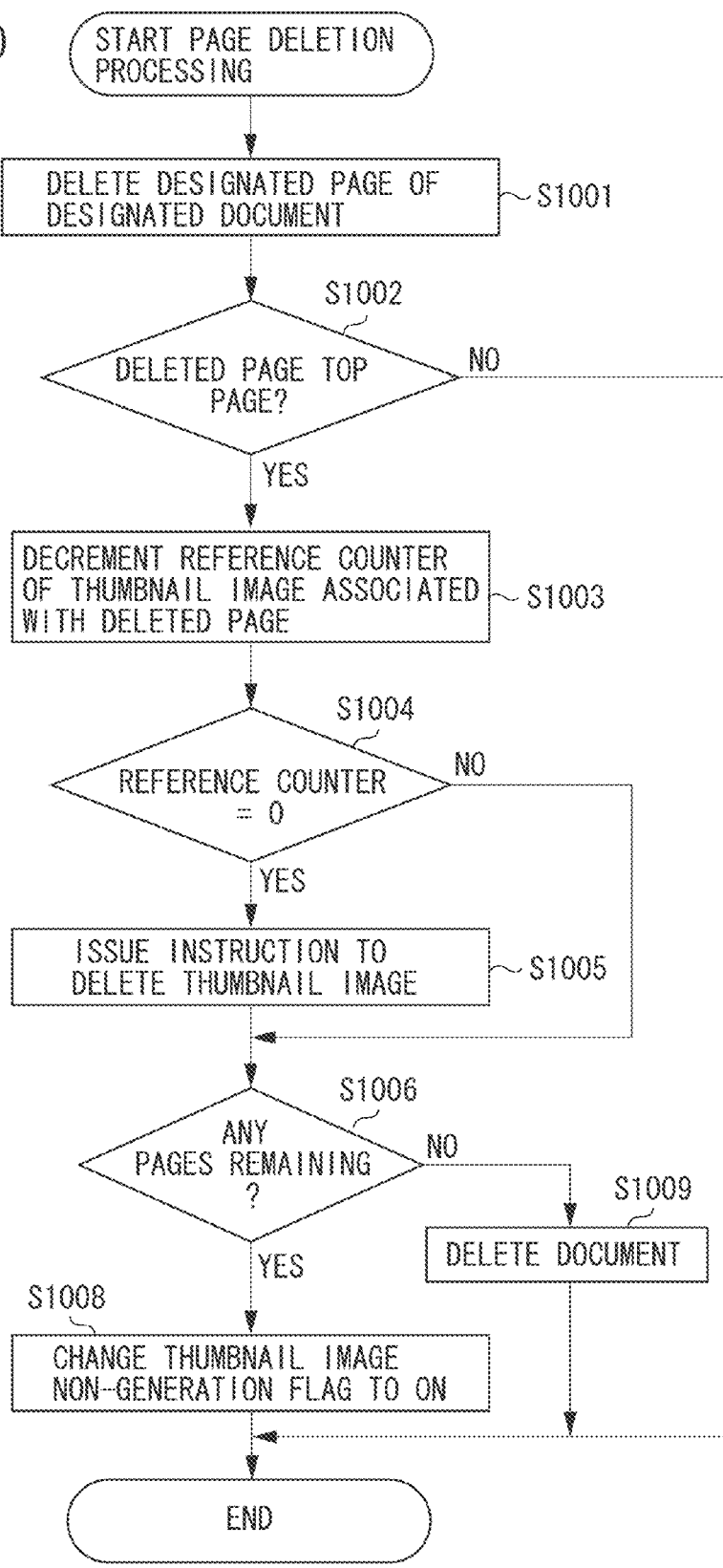
FIG. 10 is a flowchart illustrating processing for deleting an arbitrary page of a document stored in a box.

FIG. 10 is a flowchart illustrating processing for deleting a specific page of a document in a box. The processing performed in the flowchart in FIG. 10 is started based on a user's instruction made on the operation unit 102. Each step illustrated in the flowchart in FIG. 10 is realized by the CPU 203 executing a program that is loaded from the HDD 206 into the RAM 205.

First, in step S1001, the CPU 203 receives from the user via the operation unit 102 a deletion instruction to delete a designated page of a designated document, and deletes the designated page of the document based on the instruction. The deletion instruction includes, for example, the document ID and a page number of the page to be deleted. The CPU 203 deletes the designated page of the document in the box based on the deletion instruction. The designation of the page to be deleted can be performed by designating, for example, "delete from the first to the fifth pages of the document", and "delete pages 1, 3 and 5". In addition, it may be designated to "delete the first page only" or "delete from the fifth page and subsequent pages".

According to the present exemplary embodiment, when the designated page of the document is deleted, only the pages for which a deletion instruction is not issued remain, so that the document is formed from those remaining pages. For example, if a document formed from five pages is stored in the box, and an instruction to delete the first page is issued to the document. In this case, the second to fifth pages will remain, so that the second page will newly become the top page.

In step S1002, the CPU 203 determines whether the document page to be deleted based on the deletion instruction includes the first page, namely, the top page. If it is determined that the deleted page includes the top page (YES in step S1002), since the top page (top page after deletion) and the thumbnail image of the document are different, a thumbnail image has to be newly generated. Consequently, the processing proceeds to step S1003 and subsequent steps.

In step S1003, the CPU 203 decrements the reference counter of the thumbnail image ID corresponding to the document ID of the document for which the deletion instruction is issued based on the document list 701 and the thumbnail image management table 801.

In step S1004, the CPU 203 confirms the reference counter of the thumbnail image ID decremented in step S1003. If it is determined that the reference counter is zero (YES in step S1004), the processing proceeds to step S1005, and the CPU 203 deletes the thumbnail image. On the other hand, if it is determined that the reference counter is one or more (NO in step S1004), since the thumbnail image is associated with another document, the CPU 203 does not delete the document, and the processing proceeds to step S1006.

In step S1006, the CPU 203 determines whether there are any remaining pages of the document for which the deletion instruction is issued. If it is determined that there are no remaining pages (NO in step S1006), the processing proceeds to step S1009, and the CPU 203 deletes the document per se. On the other hand, if it is determined that there is a remaining page (YES in step S1006), the processing proceeds to step S1008. In step S1008, the CPU 203 changes the thumbnail image non-generation flag from "OFF" to "ON". Consequently, when the thumbnail image generation processing in FIG. 6 is executed later, a new thumbnail image (an image of a page that originally was the second or subsequent page) is generated, and the thumbnail image ID associated with the document is registered in the document list 701.

<Document Merging Processing>

Figure 11:
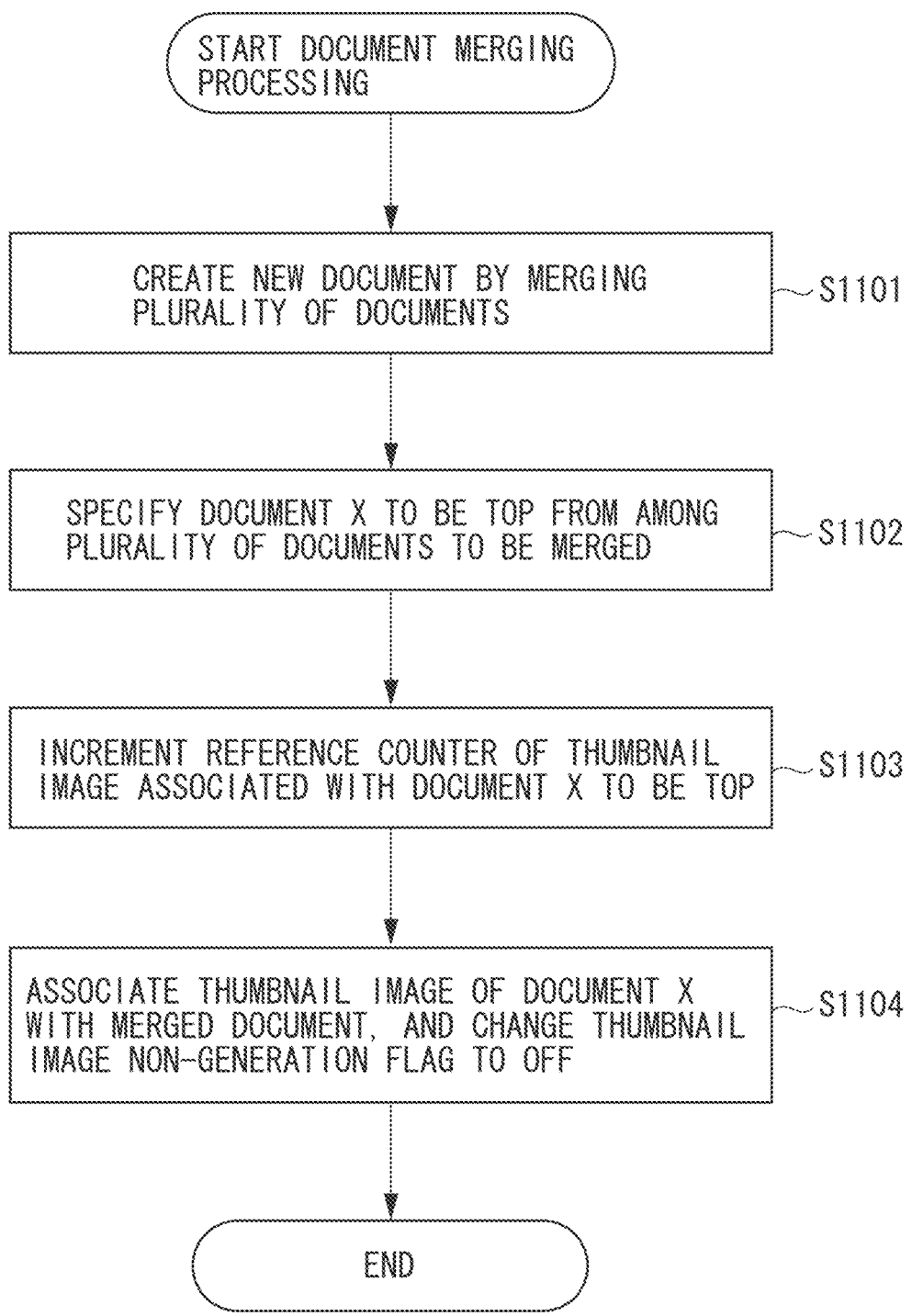
FIG. 11 is a flowchart illustrating processing for merging a plurality of documents stored in a box.

FIG. 11 is a flowchart illustrating processing of a document merging function for newly generating a merged document (e.g., a document C) by merging a plurality of documents (e.g., documents A and B) stored in a box. Each step illustrated in the flowchart in FIG. 11 is realized by the CPU 203 executing a program that is loaded from the HDD 206 into the RAM 205.

The processing in the flowchart in FIG. 11 is started when an instruction to merge documents is received from the user via the operation unit 102. The received instruction includes the document IDs of a plurality of documents to be merged and information designating the order that the documents are to be merged in.

For example, when the document A and the document B are to be merged, since there are two possible merging orders, merging the document A then the document B or merging the document B then the document A, the user designates which order the merging is to be performed in. This also applies when three or more documents are to be merged.

In step S1101, the CPU 203 receives a document merging instruction, merges the plurality of documents which are targets of the instruction, and creates a new document in which those documents are merged. For example, when an instruction to merge the document A and the document B in order of the document A then the document B is received, and the document A is formed from images of three pages and the document B is formed from images of two pages. In this case, one document formed from five pages is created in which the document B follows after the document A. The documents to be merged (i.e., in the above example, the documents A and B) are remained without deleting them from the box even after merging.

In step S1102, the CPU 203 specifies the top document among the plurality of documents to be merged. For example, if the document A and the document B are to be merged in order of the document A then the document B, the document A is specified as the top document. On the other hand, if the document A and the document B are to be merged in order of the document B then the document A, the document B is specified as the top document.

In step S1103, the CPU 203 obtains from the document list 701 the thumbnail image ID corresponding to the document ID of the top document specified in step S1102, and also obtains from the management table 801 the reference counter corresponding to the thumbnail image ID of the thumbnail image. Further, the CPU 203 increments the obtained reference counter.

In step S1104, the CPU 203 provides a document ID for the document created by the merging processing in step S1101. The CPU 203 adds the provided document ID to the document list 701, and associates it with the thumbnail image ID of the top document specified in step S1102. In addition, the CPU 203 sets the thumbnail image non-generation flag in the document list 701 to OFF.

The above is a description about the processing for merging documents. According to the present exemplary embodiment, when merging processing is executed, since the thumbnail image is the same as one of the thumbnail images of the documents to be merged, a link to the thumbnail image of the original document is simply provided without generating a new thumbnail image. Consequently, duplicate generation of the thumbnail image can be prevented, thereby avoiding unnecessary usage of the hard disk storage area.

<Document Insertion Processing>

Next, document insertion processing will be described. Document insertion processing refers to processing for inserting another document at an arbitrary page position of a predetermined document. For example, if the document A is a document formed from images of three pages and the document B is a document formed from images of two pages, and processing is designated for inserting the document B between the second and third pages of the document A, the following document C is created. More specifically, a single document C is created in which an image of the first page of the document A, an image of the second page of the document A, an image of the first page of the document B, an image of the second page of the document B, and an image of the third page of the document A are merged in that order.

Figure 12:
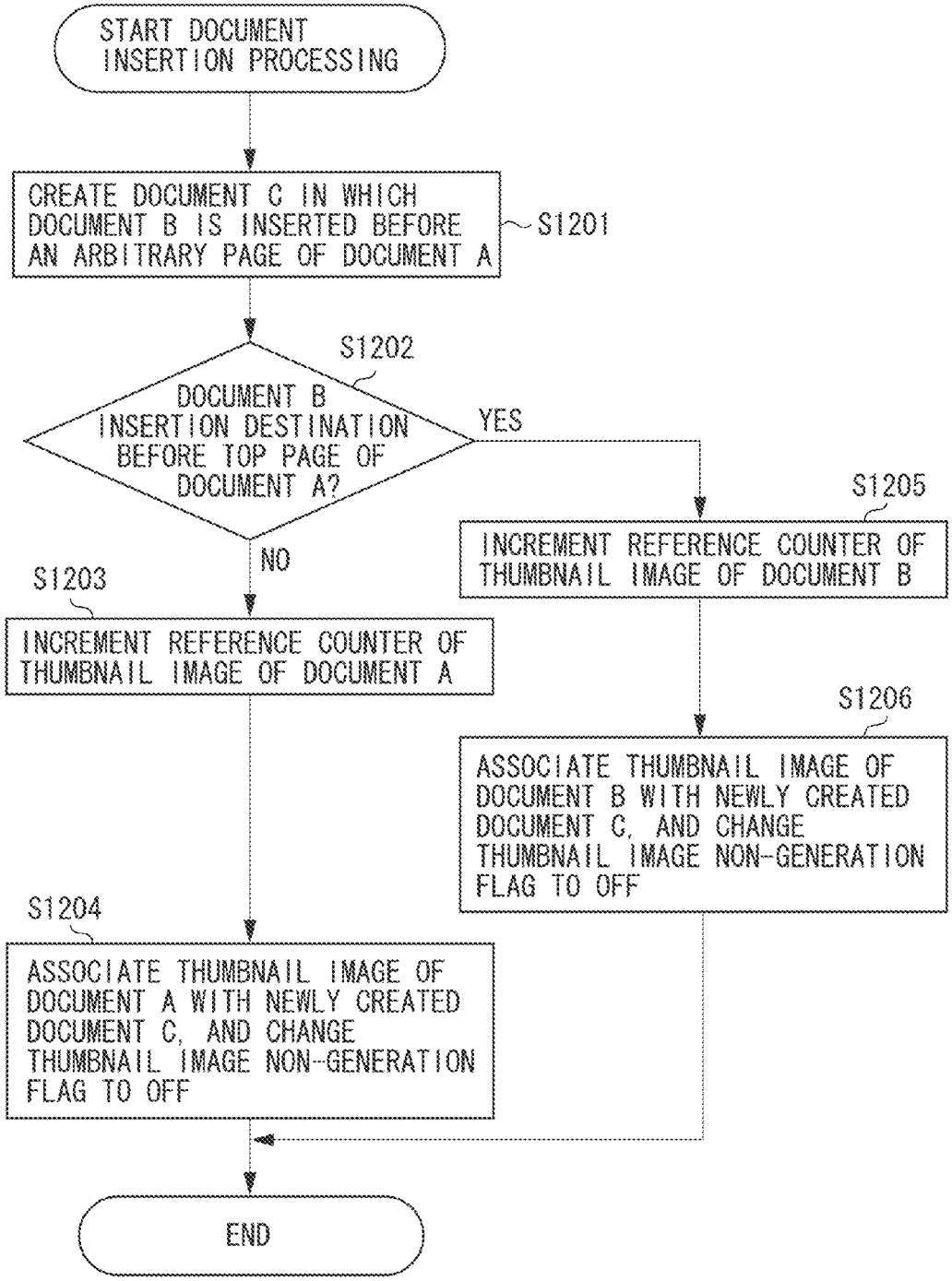
FIG. 12 is a flowchart illustrating processing for inserting a document B before an arbitrary page of a document A that is stored in a box.

FIG. 12 is a flowchart illustrating insertion processing of a predetermined document. Each step illustrated in the flowchart in FIG. 12 is realized by the CPU 203 executing a program that is loaded from the HDD 206 into the RAM 205.

The processing in the flowchart in FIG. 12 is started when an instruction to insert a document is received from the user via the operation unit 102. The received instruction includes the document ID of the document B to be inserted, the document ID of the document A that is an insertion destination of the document, and information designating which pages of the insertion destination document A the document B is to be inserted between.

In step S1201, the CPU 203 creates a document C in which the insertion target document B is inserted to a designated position in the insertion destination document A based on the received document insertion instruction.

In step S1202, the CPU 203 determines whether the insertion destination of the document B is before the top page of the document A. This determination is performed based on the information about the page position that is included in the instruction received from the user.

If it is determined that the insertion destination of the document B is not before the top page of the document A (NO in step S1202), the processing proceeds to step S1203. In step S1203, the CPU 203 obtains from the document list 701 the thumbnail image ID of the insertion destination document A, and obtains from the management table 801 the reference counter of the thumbnail image ID of the document A. Then, the CPU 203 increments the reference counter.

In step S1204, the CPU 203 provides a document ID for the document created by the insertion processing in step S1201. The CPU 203 adds the provided document ID to the document list 701, and associates it with the thumbnail image ID of the document A. In addition, the CPU 203 sets the thumbnail image non-generation flag corresponding to the document C to OFF.

If it is determined in step S1202 that the insertion destination of the document B is before the top page of the document A (YES in step S1202), the processing proceeds to step S1205. In step S1205, the CPU 203 obtains from the document list 701 the thumbnail image ID of the insertion target document B, and also obtains from the management table 801 the reference counter of the thumbnail image ID of the document B. Further, the CPU 203 increments the value of the obtained reference counter.

In step S1206, the CPU 203 provides a document ID for the document created by the insertion processing in step S1201. The CPU 203 adds the provided document ID to the document list 701, and associates it with the thumbnail image ID of the document B. In addition, the CPU 203 sets the thumbnail image non-generation flag of the document C to OFF.

The above is a description about the document insertion processing. The thumbnail image of the document C that is newly created by the insertion processing according to the present exemplary embodiment is the same as the document thumbnail image of either the insertion destination document or the insertion target document. Therefore, a new thumbnail image is not generated for the document C, and a link to an already existing document thumbnail image is provided. Consequently, duplicate generation of the thumbnail image can be prevented, thereby avoiding unnecessary usage of the hard disk storage area.

<Page Insertion Processing>

Next, insertion processing of a page of a document stored in a box will be described. Page insertion processing refers to the creation of a document C in which a page of the document B is inserted before an arbitrary page of the document A.

Figure 13:
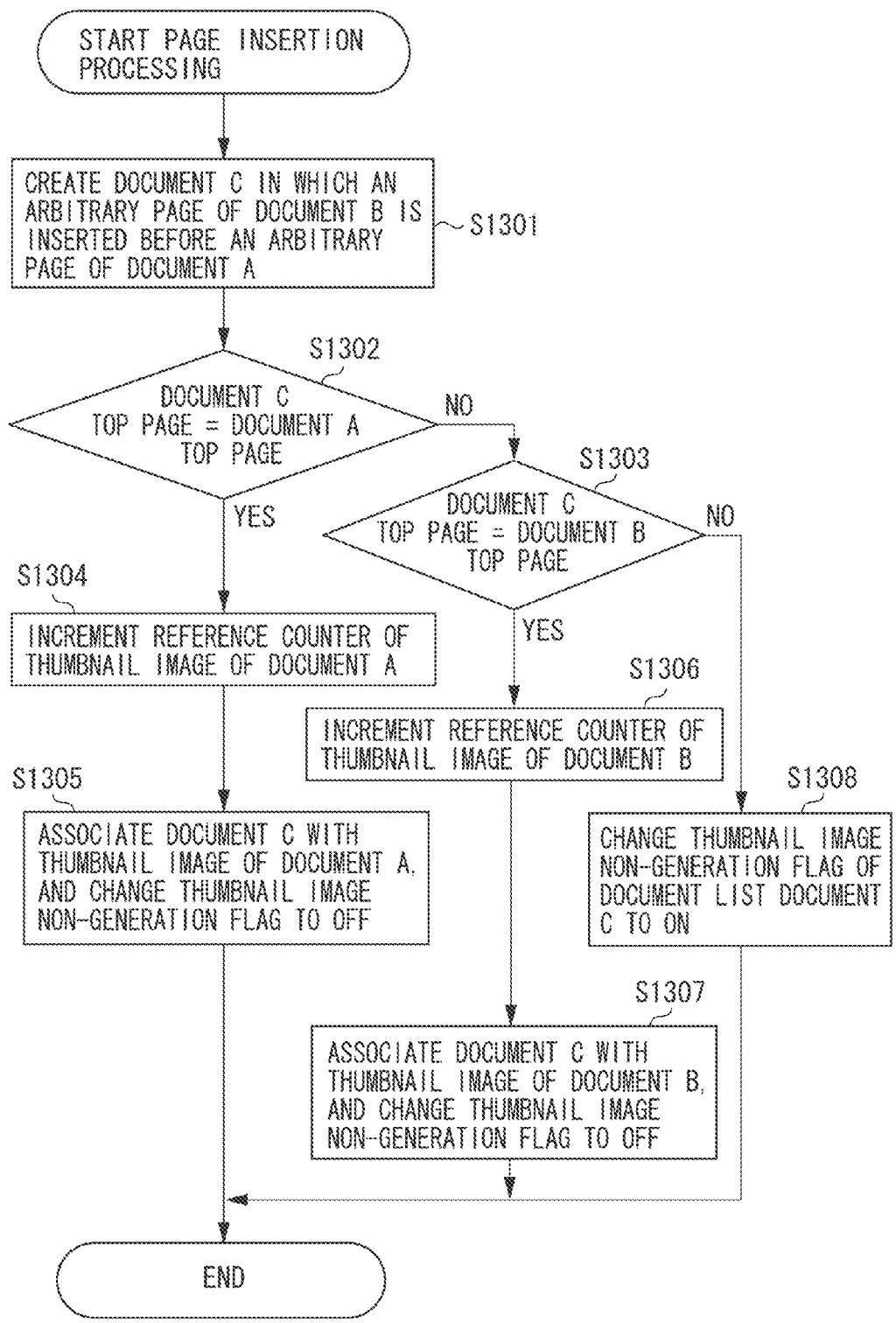
FIG. 13 is a flowchart illustrating processing for inserting an arbitrary page of a document B before an arbitrary page of a document A that is stored in a box.

FIG. 13 is a flowchart illustrating the page insertion processing. The processing in the flowchart in FIG. 13 is started based on the reception of an instruction from the user to insert a page of a document into another document. The instruction received from the user includes at least the following four pieces of information. More specifically, the document ID of the document A that is the insertion destination, an insertion destination page number indicating which page position of the document A the page is to be inserted into, the document ID of the insertion target document B, and an insertion target page number for designating which page(s) among the pages of the document B is/are to be inserted.

Each step illustrated in the flowchart in FIG. 13 is realized by the CPU 203 executing a program that is loaded from the HDD 206 into the RAM 205.

In step S1301, the CPU 203 creates a new document C by inserting the document B into the document A based on the instruction received from the user.

In step S1302, the CPU 203 determines whether the top page of the document C created in step S1301 matches the top page of the document A. This determination is performed based on the insertion destination page number of the document A included in the instruction received from the user. More specifically, if the insertion destination page number of the document A is a number other than page 1 (i.e., a case where the document B is inserted at the second or subsequent page of the document A), the CPU 203 determines that the top page of the newly created document C matches the top page of the document A (YES in step S1302), and the processing proceeds to step S1304.

In step S1304, the CPU 203 increments the reference counter of the thumbnail image of the document A. In step S1305, the CPU 203 associates the thumbnail image of the document C with the thumbnail image of the document A, and sets the thumbnail image non-generation flag of the document C to OFF. Then, the processing in FIG. 13 is finished.

On the other hand, in step S1303, the CPU 203 determines whether the top page of the document C matches the top page of the document B. This determination is performed based on the insertion destination page number of the document A and the insertion target page number of the document B included in the instruction received from the user. More specifically, if the insertion destination page number of the document A is page 1 (i.e., in a case where the document B is inserted before the top page of the document A), and if the insertion target page number of the document B includes page 1 (i.e., the top page of the document B is the insertion target), the CPU 203 determines that the top page of the newly created document C and the top page of the insertion target document B match (YES in step S1303), and the processing proceeds to step S1306.

In step S1306, the CPU 203 increments the reference counter of the thumbnail image of the document B. In step S1307, the CPU 203 associates the thumbnail image of the document C with the thumbnail image of the document B, and sets the thumbnail image non-generation flag of the document C to OFF. Then, the processing in FIG. 13 is finished.

The processing in step S1308 is performed when it is determined that the top page of the document C does not match either the thumbnail image of the document A or the thumbnail image of the document B. More specifically, in step S1308, the CPU 203 adds the document ID of the document C to the document list 701 for the created document C, and sets the corresponding thumbnail image non-generation flag to ON.

The above is a description about the page insertion processing. For the document C that is newly created by the page insertion processing, the thumbnail image of the document A or the document B may become the thumbnail image of the document C, or a thumbnail image may no longer exist. In the former case, similar to the processing in FIGS. 11 and 12, a new thumbnail image is not generated for the document C, and a link to an already existing document thumbnail image is provided. In the latter case, the thumbnail image non-generation flag is set to ON so that a thumbnail image for the document C will be newly generated.

<Page Movement Processing>

Figure 14:
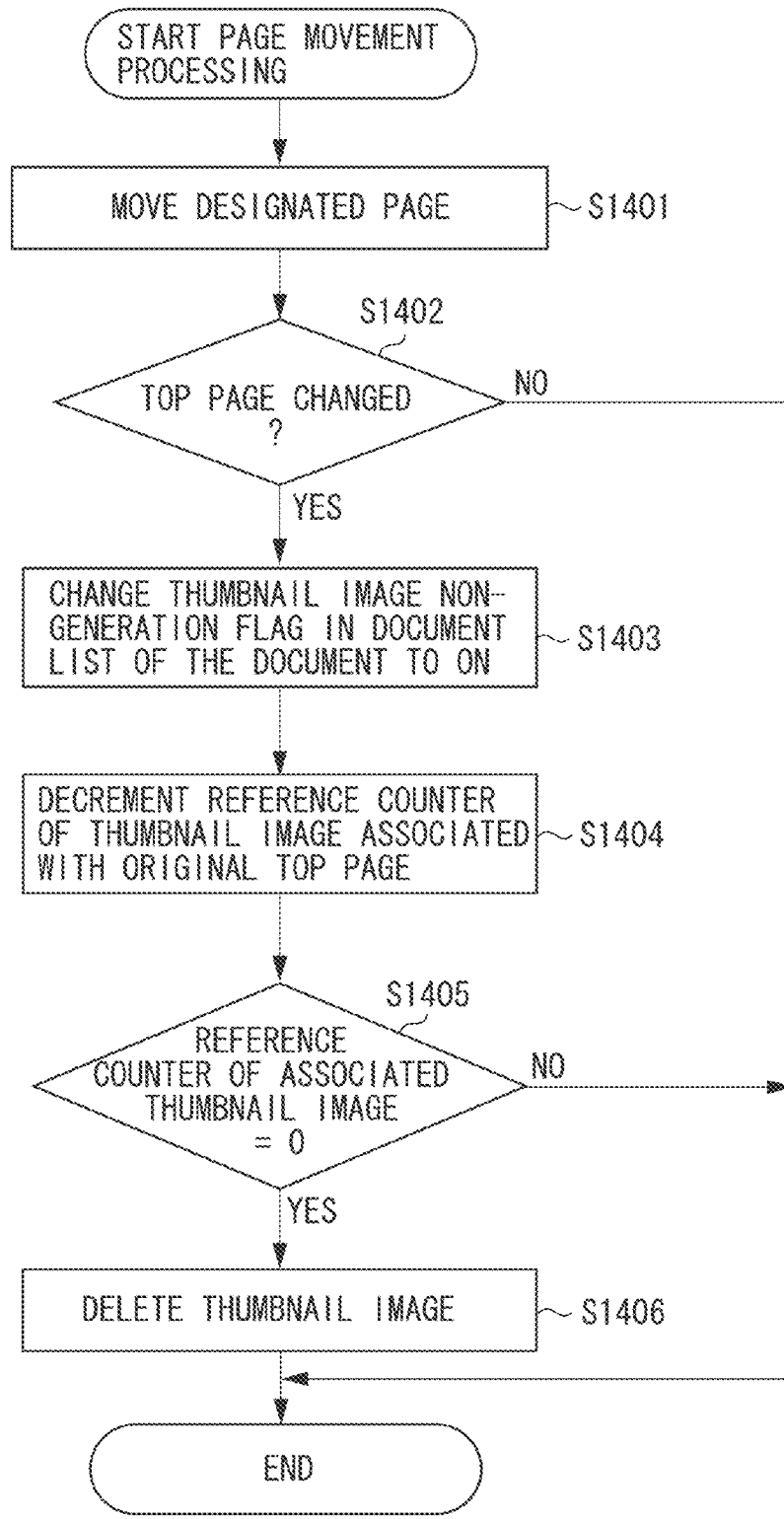
FIG. 14 is a flowchart illustrating processing for moving a page of a document stored in a box.

FIG. 14 is a flowchart illustrating a page movement function of moving a page of a predetermined document to another page within the document. Each step illustrated in the flowchart in FIG. 14 is realized by the CPU 203 executing a program that is loaded from the HDD 206 into the RAM 205.

In step S1401, the CPU 203 moves a designated page among the pages forming the document to another page of the document based on an instruction received from the user.

In step S1402, the CPU 203 determines whether there is a change to the top page of the document on which the movement processing was performed. If it is determined that the top page is changed (YES in step S1402), the processing proceeds to step S1403. If it is determined that the top page is not changed (NO in step S1402), the processing in FIG. 14 is finished.

In step S1403, the CPU 203 sets the thumbnail image non-generation flag of the created document to ON. Then, in step S1404, the CPU 203 decrements the reference counter of the thumbnail image associated with the original top page (i.e., the top page before executing the page movement processing).

In step S1405, the CPU 203 determines whether the value of the reference counter that is decremented in step S1404 is zero. If it is determined that the value of the reference counter is zero (YES in step S1405), the processing proceeds to step S1406. In step S1406, the CPU 203 deletes the thumbnail image, and the processing in FIG. 14 is then finished. On the other hand, if it is determined that the value of the reference counter is one or more (NO in step S1405), the processing in FIG. 14 is finished without deleting the thumbnail image.

The above is a description about the page movement processing. According to the present exemplary embodiment, if the document top page is changed, a thumbnail image is newly generated. Consequently, a situation in which the top page of the document and the thumbnail image of the document stored in the box do not match can be prevented.

<Thumbnail Image Display Processing>

Next, the processing for displaying a thumbnail image of a document stored in the box on the operation unit 102 will be described with reference to FIG. 15. The processing in the flowchart in FIG. 15 is started when the user issues an instruction to display a list of the documents stored in the box by operating a touch panel on the operation unit 102.

Figure 15:
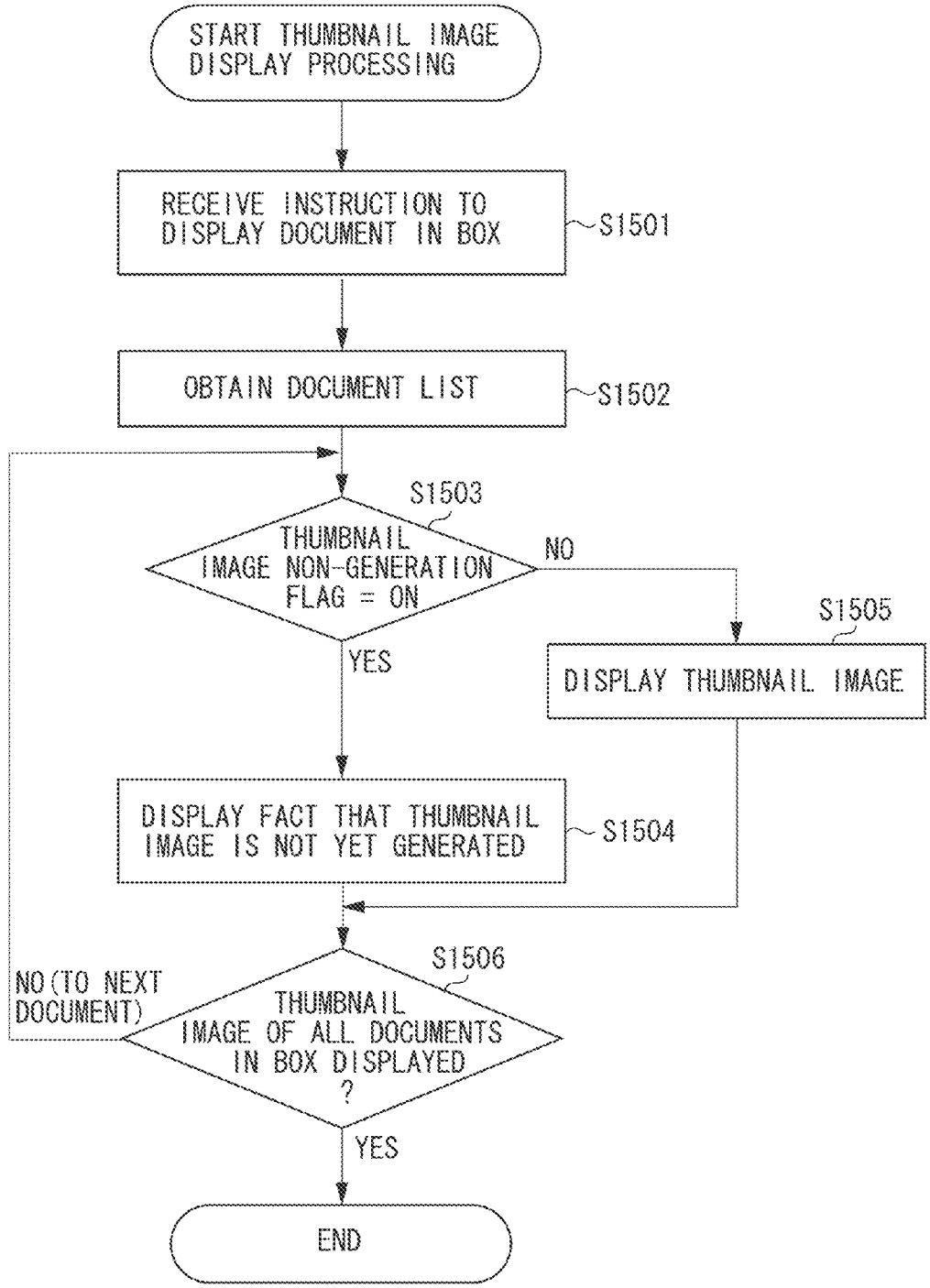
FIG. 15 is a flowchart illustrating processing for displaying a thumbnail image.

Each step illustrated in the flowchart in FIG. 15 is realized by the CPU 203 executing a program that is loaded from the HDD 206 into the RAM 205.

First, in step S1501, the CPU 203 receives an instruction from the user to display the documents that are stored in the box. Upon receiving the instruction, in step S1502, the CPU 203 obtains the document list 701 from the HDD 206. The document list is a list like that illustrated in FIG. 7, which lists all of the documents that are stored in the box.

In step S1503, the CPU 203 focuses on one document listed in the document list 701, and confirms whether the thumbnail image non-generation flag corresponding to the document ID of the document that is being focused on is set to ON. If it is confirmed that the thumbnail image non-generation flag is set to ON (YES in step S1503), the processing proceeds to step S1504. In step S1504, the CPU 203 displays on the operation unit 102 the fact that a thumbnail image has not yet been generated (e.g., a message such as "NO IMAGE"), and the processing then proceeds to step S1506. On the other hand, if it is confirmed that the thumbnail image non-generation flag corresponding to the document ID of the document that is being focused on is set to OFF (NO in step S1503), the processing proceeds to step S1505. In step S1505, the CPU 203 reads from the HDD 206 the thumbnail image that is identified by the thumbnail image ID corresponding to the document ID, and displays the read thumbnail image on the operation unit 102. Then, the processing proceeds to step S1506.

In step S1506, the CPU 203 determines whether confirmation has been performed for all of the documents listed in the document list. If it is determined that confirmation has been performed for all of the documents (YES in step S1506), the processing in FIG. 15 is finished. If it is determined that confirmation has not been performed for all of the documents (NO in step S1506), the CPU 203 focuses on the next document, and repeats the processing from step S1504 and the subsequent steps.

Figure 16:
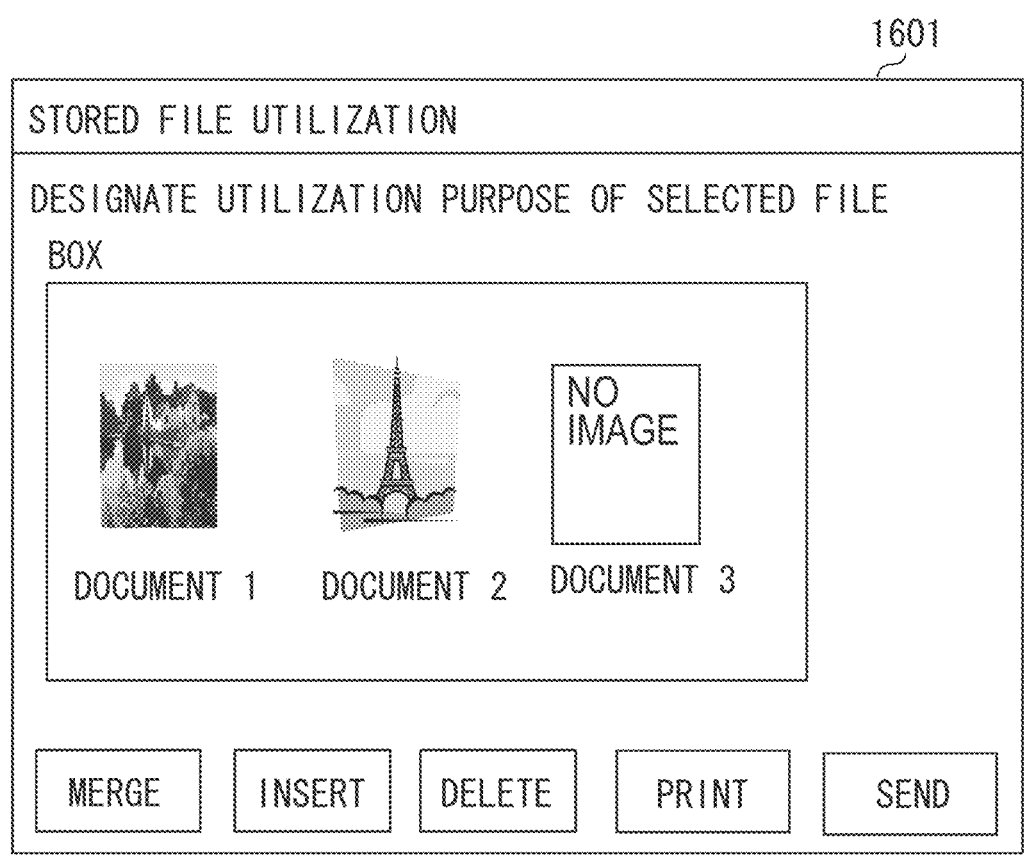
FIG. 16 is an example of a screen of a document list that is displayed on an operation unit of an image processing apparatus.

FIG. 16 illustrates an example of a screen that is displayed on the operation unit 102 when the thumbnail image display processing in FIG. 15 is executed.

A screen 1601 in FIG. 16 is displayed on the operation unit 102 of the image processing apparatus 101. The screen 1601 is a screen example when three documents are stored in the box of the image processing apparatus 101. Since thumbnail images are associated with the document 1 and the document 2 respectively, the thumbnail image is displayed for both of these documents. In contrast, since a thumbnail image has not yet been generated for the document 3, the message "NO IMAGE" is displayed that indicates that there is no thumbnail image. Although not illustrated in FIG. 16, a button for designating whether to display a thumbnail may be displayed, and the screen can be switched between displaying the thumbnail image or just the document ID by the button.

In addition, on the screen 1601, an arbitrary document can be selected from among the displayed documents, and processing such as page deletion, document deletion, document merging, printing, and sending can be executed on the selected document.

The above is a description of all of the operations relating to the documents stored in the box.

According to the present exemplary embodiment, an image processing apparatus can be provided that is capable of, when a plurality of documents having the same top page are stored in a box, managing the documents without storing duplicate thumbnails. More specifically, since the present exemplary embodiment is configured to separately include a document list 701 and a thumbnail image management table 80, a thumbnail image can be shared by a plurality of documents, and the documents can be efficiently managed.

Further, according to the present exemplary embodiment, documents and thumbnail images stored in the box of the image processing apparatus 101 can be appropriately associated with. More specifically, the present exemplary embodiment is configured so that when the top page of a document stored in the box is deleted, a thumbnail image is newly generated since the thumbnail image of the document and the top page of the document from which the top page was deleted no longer match. This processing has the advantageous effect of eliminating situations in which the thumbnail image of the document and the top page of the document are different, thus preventing the user from becoming confused.

Further, the present exemplary embodiment is configured so that when a document stored in the box is deleted, rather than uniformly deleting the document thumbnail image, the image processing apparatus 101 confirms whether there are any documents associated with that thumbnail image, and based on that confirmation result, determines whether to delete the thumbnail image. Consequently, cases in which even the thumbnail image of another document is deleted due to the deletion of a document can be prevented.

Furthermore, the present exemplary embodiment is configured so that when a single document is created by merging a plurality of documents stored in the box, rather than newly generating a thumbnail image for the created document, a link is provided to a document thumbnail image that already exists. This processing has the advantage that thumbnail images are not needlessly generated.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-157554 filed Jul. 13, 2012, which is hereby incorporated by reference herein in its entirety.

What is claimed is:

1. An image processing apparatus comprising:
    a storage unit configured to store a document having a plurality of pages and a thumbnail image representing the document, the thumbnail image being created from a top page of the document;
    an operation unit configured to display the thumbnail image on an operation screen, and input a page-deletion instruction for the document selected on the operation screen, the page-deletion instruction indicating a page of the document which is designated by a user; and
    a control unit configured to:
    delete the designated page of the document from the storage unit in response to input of the page-deletion instruction;
    determine whether or not the designated page of the document corresponds to the top page of the document; and
    delete the thumbnail image from the storage unit and re-create a new thumbnail image representing the document of which the designated page is deleted, based on a determination that the designated page of the document corresponds to the top page of the document.

2. The image processing apparatus according to claim 1, wherein a predetermined image is displayed on the operation screen during a period in which the thumbnail image is not created.

3. The image processing apparatus according to claim 1, further comprising a scanner configured to input image data on a plurality of sheets of an original, the image data being stored in the storage unit as the document.

4. The image processing apparatus according to claim 1, further comprising a reception unit configured to receive print data having a plurality of pages from an external device via a network, the print data being stored in the storage unit as the document.

5. The image processing apparatus according to claim 1, further comprising a printer,
wherein the operation unit is configured to input a print instruction for the document,
wherein the control unit is configured to cause the printer to execute a print process of the document, in response to input of the print instruction.

6. The image processing apparatus according to claim 1, wherein the operation unit is configured to input a send instruction for the document,
wherein the control unit is configured to execute a send process of the document in response to input of the send instruction.

7. The image processing apparatus according to claim 1, wherein the new thumbnail image is a thumbnail image of a top page of the document of which the designated page is deleted.

8. The image processing apparatus according to claim 1, wherein the new thumbnail image is re-created in response to the designated page being deleted.

9. The image processing apparatus according to claim 1, wherein, in a case where it is determined that the designated page does not correspond to the top page, the thumbnail image remains in the storage unit without being deleted.

10. The image processing apparatus according to claim 1, wherein the control unit is configured to periodically confirm whether a thumbnail image corresponding to a document stored in the storage unit has already been created.

11. The image processing apparatus according to claim 1, wherein the operation unit is configured to input a document-deletion instruction for deleting a whole of the document,
wherein the control unit is configured to delete the document from the storage unit in response to input of the document-deletion instruction.

12. The image processing apparatus according to claim 11, wherein the storage unit is configured to store a plurality of documents and a plurality of thumbnail images each associated with at least one of the plurality of documents,
wherein each of the plurality of documents includes a plurality of pages, and each thumbnail image is an image representing a document associated therewith.

13. The image processing apparatus according to claim 11, wherein the storage unit is configured to store a plurality of documents and a plurality of thumbnail images each associated with at least one of the plurality of documents,
wherein each of the plurality of documents includes a plurality of pages, and each thumbnail image is an image representing a document associated therewith, and
wherein the operation unit is configured to display a list including the plurality of thumbnail images.

14. The image processing apparatus according to claim 13, wherein the operation unit is configured to input a merge instruction for two documents selected from the list, and
wherein the control unit is configured to create a new document from the two documents in response to input of the merge instruction.

15. The image processing apparatus according to claim 14, wherein the control unit is configured to associate a thumbnail image of a top document of the two documents with the new document without re-creating a thumbnail image of the new document.

16. The image processing apparatus according to claim 14, wherein the new document is a document in which the two documents are merged.

17. The image processing apparatus according to claim 1, wherein the storage unit is configured to store a reference counter of the thumbnail image.

18. The image processing apparatus according to claim 17, wherein the control unit is configured to, in a case where it is determined that the designated page of the document corresponds to the top page of the document, and the reference counter of the thumbnail image is zero, delete the thumbnail image.

19. The image processing apparatus according to claim 17, wherein the control unit is configured to, in a case where it is determined that the designated page of the document corresponds to the top page of the document, and there is no remaining page of the document, and the reference counter of the thumbnail image is not zero, delete the document without deleting the thumbnail image.

20. A non-transitory computer-readable storage medium that stores a program for causing a computer to function as each unit in the image processing apparatus according to claim 1.

21. A method for controlling an image processing apparatus comprising:
associating and storing in a storage unit a document having a plurality of pages and a thumbnail image representing the document, the thumbnail image being created from a top page of the document;
displaying the thumbnail image on an operation screen, and inputting a page-deletion instruction for the document selected on the operation screen, the page-deletion instruction indicating a page of the document which is designated by a user;
deleting the designated page of the document from the storage unit in response to input of the page-deletion instruction;
determining whether or not the designated page of the document corresponds to the top page of the document; and
deleting the thumbnail image from the storage unit and re-creating a new thumbnail image representing the document of which the designated page is deleted, based on the determining that the designated page of the document corresponds to the top page of the document.

* * * * *